US008686673B2

(12) United States Patent
Matsuki et al.

(10) Patent No.: US 8,686,673 B2
(45) Date of Patent: Apr. 1, 2014

(54) CONTROL DEVICE FOR ELECTRIC ROTARY MACHINE

(75) Inventors: Yousuke Matsuki, Chiryu (JP); Akihiro Imura, Chita-gun (JP)

(73) Assignee: Denso Corporation, Kariya (JP)

( * ) Notice: Subject to any disclaimer, the term of this patent is extended or adjusted under 35 U.S.C. 154(b) by 541 days.

(21) Appl. No.: 13/020,236

(22) Filed: Feb. 3, 2011

(65) Prior Publication Data

US 2011/0193505 A1 Aug. 11, 2011

(30) Foreign Application Priority Data

Feb. 8, 2010 (JP) .................................. 2010-025141

(51) Int. Cl.
*H02P 21/00* (2006.01)

(52) U.S. Cl.
USPC ...................... 318/400.02; 318/432; 318/434

(58) Field of Classification Search
USPC ..................................... 318/400.02, 432, 434
See application file for complete search history.

(56) References Cited

U.S. PATENT DOCUMENTS

| 5,023,538 | A * | 6/1991 | Mutoh et al. .................. 318/811 |
| 6,462,492 | B1 * | 10/2002 | Sakamoto et al. ........ 318/400.32 |
| 7,521,889 | B2 * | 4/2009 | Iura et al. ...................... 318/759 |
| 8,362,759 | B2 * | 1/2013 | Ha et al. ..................... 324/76.15 |
| 2006/0125435 | A1 | 6/2006 | Geyer et al. |
| 2009/0160376 | A1 * | 6/2009 | Yamada ................... 318/400.02 |

FOREIGN PATENT DOCUMENTS

| JP | 2003-047299 | 2/2003 |
| JP | 2006-174697 | 6/2006 |
| JP | 2008-228419 | 9/2008 |

* cited by examiner

*Primary Examiner* — Erick Glass
(74) *Attorney, Agent, or Firm* — Nixon & Vanderhye PC (57) ABSTRACT

A control device controls a power conversion circuit so as to adjust control values of a motor generator to optimum values. The power conversion circuit has switching elements for selectively connecting and disconnecting a battery and terminals of the motor generator. The control device sets a simulated voltage vector V(n+1) in one control-period forward to perform a prediction model control. On predicting a current, the control device uses a model in a rotary coordinate system, and sets the median value of the voltage vector V(n+1) in one control-period Tc to a value of the voltage vector V(n+1) in the rotary coordinate system. The control device sets, as the value of the voltage vector V(n+1) in the rotary coordinate system, the voltage vector V(n+1) when the half-time of the control-period Tc is elapsed from the time at the electric angle $\theta(n+1)$.

9 Claims, 7 Drawing Sheets

| VOLTAGE VECTOR | TURNED-ON SWITCHING ELEMENTS | | |
|---|---|---|---|
| | U PHASE | V PHASE | W PHASE |
| V0 | BOTTOM | BOTTOM | BOTTOM |
| V1 | TOP | BOTTOM | BOTTOM |
| V2 | TOP | TOP | BOTTOM |
| V3 | BOTTOM | TOP | BOTTOM |
| V4 | BOTTOM | TOP | TOP |
| V5 | BOTTOM | BOTTOM | TOP |
| V6 | TOP | BOTTOM | TOP |
| V7 | TOP | TOP | TOP |

CONTROL DEVICE FOR ELECTRIC ROTARY MACHINE

CROSS-REFERENCE TO RELATED APPLICATION

This application is related to and claims priority from Japanese Patent Application No. 2010-25141 filed on Feb. 8, 2010, the contents of which are hereby incorporated by reference.

BACKGROUND OF THE INVENTION

1. Field of the Invention

The present invention relates to control devices for adjusting control values such as the output torque and rotation speed of an electric rotary machine, and in particular, the control device controls an electric power conversion circuit equipped with switching elements so as to selectively open and close electric connection lines between a voltage supply unit capable of supplying a different voltage and terminals of the electric rotary machine in order to adjust the control values of the electric rotary machine.

2. Description of the Related Art

For example, there is a control device for performing a triangle-wave comparison PWM (pulse width modulation). The control device calculates an instruction voltage of each phase of a three phase electric rotary machine, and compares the calculated instruction voltage of each phase with a triangle-wave carrier, and selectively operating switching elements which form an inverter as an electric power conversion circuit of the electric rotary machine on the basis of the comparison result. Such a control device is available in the commercial market.

Recently, there is a conventional control device, for example, disclosed in a Japanese patent laid open publication No. JP 2008-228419, which performs a prediction model control capable of predicting a current which flows in each phase of a three-phase electric rotary machine under various operation states of an inverter, The conventional control device then adjusts the inverter so as to operate under the operation state with a minimum difference value between the predicted current value and an instruction current value. Because such a prediction model control adjusts the operation state of the inverter to the optimum operation state having an optimum current value which has been predicted on the basis of the output voltage of the inverter, this makes it possible to increase the accuracy of the follow-up control signal which follows the instruction current when the inverter enters its transition state when compared with the accuracy obtained by the triangle-wave PWM control previously described.

It can be understood for the above prediction model control to be applied to high accuracy applications such as a device for controlling a motor generator (alternator) as an on-vehicle main machine which needs to perform the follow-up control with high accuracy.

There is another conventional technique to perform the above prediction model control. For example, Japanese patent laid open publication No. JP 2006-174697 discloses such a conventional technique to perform the prediction model control.

However, the more an electrical angular velocity of an electric rotary machine increases and the period of time of updating the operation state of the electric rotary machine becomes long, the more the control accuracy decreases.

SUMMARY OF THE INVENTION

It is an object of the present invention to provide a control device which can prevent any decrease in performance of the electric rotary machine when the angular velocity is increased or an updating time period of the operation state is set when the control values of the electric rotary machine is controlled. The control device according to the present invention controls the operation of an electric rotary machine through an electric power conversion circuit equipped a plurality of switching elements. The control device selectively selects the switching elements by opening and closing (or connecting and disconnecting) connection lines between a voltage supplying means supplying a different voltage is connected to terminals of the electric rotary machine.

To achieve the above purposes, the present invention provides a control device of controlling an electric power conversion circuit in order to adjust control values of an electric rotary machine as a control target. The electric power conversion circuit is equipped with a plurality of switching elements. The connection lines between a voltage supply means and terminals of the electric rotary machine are selectively connected and disconnected by the switching elements. The voltage supply means supplies a different voltage to the electric rotary machine. The control device has a prediction means and an operation means. The prediction means predicts the control values of the electric rotary machine corresponding to a virtual (or simulation) operation state of the electric power conversion circuit on the basis of relation information in a rotary coordination system between an output voltage vector of the electric power conversion circuit and one of the control values and parameters to be used for calculating the control values. The operation means determines a next operation state of the electric power conversion circuit on the basis of the predicted control values obtained by the prediction means, and operates the electric power conversion circuit on the basis of the determined next operation state. The prediction means sets, to each component of the output voltage vector of the electric power conversion circuit in the rotary coordinate system, a value at a time during a period counted from the time when the virtual operation state of the electric power conversion circuit is determined and set to the electric power conversion circuit to the time when the control values of the rotary machine become the predicted control values.

Each component of the output voltage vector of the electric power conversion circuit is changed in the rotary coordinate system according to the rotation of the electric rotary machine. For example, when each component of the output voltage vector is set at the operation time, it is necessary to predict an output voltage vector which is obtained by adding an output voltage vector of a delayed phase to an real or current output voltage vector. In particular, the more the electric angular velocity becomes large and the updating period of the operation state of the electric power conversion circuit becomes long, the more this delayed phase is increased. In order to avoid this problem, the prediction means in the control device according to the present invention sets, to each component of the output voltage vector of the electric power conversion circuit, a value at a time during the period counted from the time when the virtual operation state of the electric power conversion circuit is determined and set to the electric power conversion circuit to the time when the control values of the rotary machine become the predicted control values. This makes it possible to suppress the error generated by performing discretization.

In the control device as another aspect of the present invention, the prediction means performs discretization of a relation model in the rotary coordinate system between the output voltage vector of the electric power conversion circuit and one of the control values of the electric rotary machine and the parameters to be used for calculating the control values by one of forward difference method and backward difference method. The prediction means adjusts each component of the output voltage vector of the electric power conversion circuit in the virtual operation state with the value at the time during the period.

Using the forward difference method on performing the discretization of the relation model in the rotary coordinate system makes it possible to easily realize the prediction means.

In the control device as another aspect of the present invention, the prediction means sets a vector at the median during the period to the output voltage vector of the electric power conversion circuit in the virtual operation state.

In the control device as another aspect of the present invention, the prediction means sets an average value during the period to the output voltage vector of the electric power conversion circuit in the virtual operation state.

In the control device as another aspect of the present invention, the prediction means sets, to each component of the output voltage vector of the electric power conversion circuit in the virtual operation state, the median value between the value when the next operation state is set to the electric power conversion circuit and the value at the time when the operation state of the electric power conversion circuit becomes the predicted operation state.

In the control device as another aspect of the present invention, the prediction means serves as a first prediction means. The control device further has a second prediction means for inputting the operation state of the power conversion circuit which is determined to use the operation state by the operation means. The second prediction means predicts an initial value, to be used in the prediction operation by the first prediction means, on the basis of the relation information. The second prediction means sets, to each component of the output voltage vector of the electric power conversion circuit corresponding to the determined operation state, a value at a time (for example, a predetermined time) during the period counted from the time when the determined operation state is set to the electric power conversion circuit to the time when the operation state of the electric power conversion circuit becomes the predicted operation state obtained on the basis of the predicted initial value.

On predicting the control values of the electric rotary machine at the time when the next operation state is set to the electric power conversion circuit with high accuracy when the operation state of the electric power conversion circuit is virtually predicted and set, it is preferable to obtain the initial value (control values or physical values with which the control values can be calculated) in the predicted operation state at the time which is approximately equal to the time when the next operation state is set to the electric power conversion circuit. However, because the control values of the electric rotary machine must be predicted before the next operation state is actually set to the voltage control circuit, it is impossible to obtain the initial value at the time or approximate time when the next operation state is actually set to the voltage control circuit on the basis of the detection value.

On the other hand, the control device according to the present invention has the second prediction means capable of adjusting the initial value to the most suitable initial value to be used by the first prediction means. This makes it possible for the control device to predict the initial value by the prediction model control.

In the control device as another aspect of the present invention, the voltage supply means corresponds to direct current power source having a positive electrode and a negative electrode. The connection lines between the positive electrode and the negative electrode of the direct current power source and the terminals of the electric rotary machine are selectively connected and disconnected by the switching elements of the electric power conversion circuit.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Hereinafter, various embodiments of the present invention will be described with reference to the accompanying drawings. In the following description of the various embodiments, like reference characters or numerals designate like or equivalent component parts throughout the several diagrams.

First Embodiment

A description will be given of a control device 20 according to a first embodiment of the present invention with reference to FIG. 1 to FIG. 4.

The first embodiment shows a case in which the control device 20 is applied to a hybrid vehicle.

Figure 1:
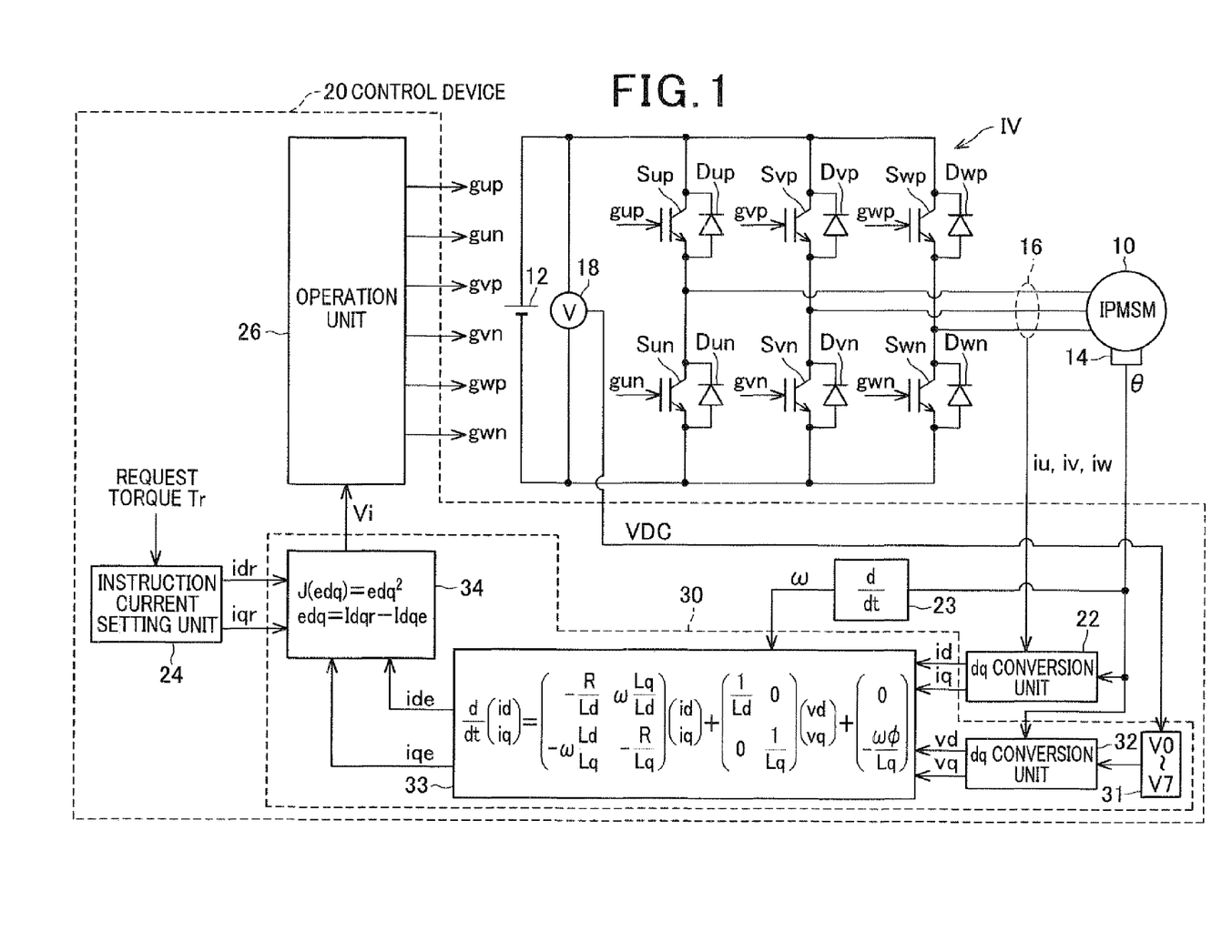
FIG. 1 is a view showing a configuration of a motor generator control system having a control device according to a first embodiment of the present invention.

FIG. 1 is a view showing a configuration of a motor generator control system equipped with the control device 20 according to the first embodiment. The motor generator 10 is an electric rotary machine such as a three phase permanent magnet synchronous motor having salient poles. That is, the motor generator 10 is an IPMSM (Interior Permanent Magnet Synchronous Motor).

The motor generator 10 as the electric rotary machine as a target to be controlled is electrically connected to a high voltage battery 12 which serves as a voltage supply means through the inverter IV. The inverter IV serves as an electric power conversion circuit equipped with three series connection units. The first series connection unit is composed of switching elements Sup and Sun connected in series. The second series connection unit is composed of switching elements Svp and Svn connected in series. The third series connection unit is composed of switching elements Swp and Swn connected in series A connection node between the switching elements Sup and Sun in the first series connection unit is electrically connected to a terminal of the U phase of the motor generator 10 through a connection line. A connection node between the switching elements Svp and Svn in the second series connection unit is electrically connected to a terminal of the V phase of the motor generator 10 through a connection line. A connection node between the switching elements Swp and Swn in the third series connection unit is electrically connected to a terminal of the W phase of the motor generator 10 through a connection line.

Each of the switching elements Sup, Sun, Svp, Svn, Swp, and Swn is composed of IGBT (Insulation Gate Bipolar Transistor). These switching elements Sup, Sun, Svp, Svn, Swp, and Swn are connected in parallel to diodes Dup, Dun, Dvp, Dvn, Dwp, and Dwn, respectively. That is, the switching elements Sup, Sun, Svp, Svn, Swp, and Swn are connected in parallel to diodes Dup, Dun, Dvp, Dvn, Dwp, and Dwn with one to one correspondence.

The motor generator control system shown in FIG. 1 has a plurality of detection means such as a rotation angle detection sensor 14, a current sensor 16, and a voltage sensor 18. The rotation angle detection sensor 14 detects the angle of rotation of the motor generator 10. The current sensor 16 detects each of the currents iu, iv, and iw is flowing in the U phase, V phase, and W phase of the motor generator 10. The voltage sensor 18 detects an input voltage of the inverter IV.

The control device 20 according to the first embodiment receives detection signals which correspond to detection values detected by the rotation angle detection sensor 14, the current sensor 16, and the voltage sensor 18, and then transferred from them through an interface (not shown). The control device 20 forms a low voltage system in the motor generator control system.

The control device 20 generates and outputs operation signals gup, gun, gvp, gvn, gwp, and gwn on the basis of the detection values transferred from these sensors 14, 16, and 18. The inverter IV as the electric power conversion circuit is controlled by the operation signals transferred from the control device 20.

The motor generator control system shown in FIG. 1 has drive units (not shown). The drive units control the turning-on operation and turning-off operation of the switching elements Sup, Sun, Svp, Svn, Swp, and Swn, respectively on the basis of the operation signals gup, gun, gyp, gvn, gwp, and gwn.

The control device 20 controls the inverter IV so that the output torque of the motor generator 10 reaches a request torque Tr. In more detail, the control device 20 controls the inverter IV so that the inverter IV outputs an instruction current in order for the motor generator 10 to output the request torque Tr.

Because the target control value is the output torque of the motor generator 10, the control device 20 controls a current flowing in the motor generator 10 so that this current reaches the instruction current value. In particular, the control device 20 according to the first embodiment performs a prediction model control to predict the current value flowing in the motor generator 10 when the operation state of the inverter IV has a plurality of operation states in order for the true current flowing in the motor generator 10 to approach the instruction current.

A description will now be given of a detailed explanation of the predict model control performed by the control device 20.

A dq conversion unit 22 converts the phase currents iu, iv, and iw detected by the current sensor 16 to true currents id, iq in a rotary coordinate system.

When receiving the electric angle θ detected by the rotation angle detection sensor 14, a rotation speed calculation unit 23 calculates a rotation speed (electric angular velocity ω) of the motor generator 10.

On the other hand, when receiving a request torque Tr, an instruction current setting unit 24 in the control device 20 outputs instruction currents idr, idq in d-q coordinate system.

When receiving the instruction currents idr, idq, the true currents id, iq, and the electric angle θ, a prediction model control unit 30 determines a voltage vector Vi on the basis of the input parameters such as the instruction currents idr, idq, the true currents id, iq, and the electric angle θ.

When receiving the voltage vector Vi, the operation unit 26 generates the operation signals gup, gun, gvp, gvn, gwp, and gwn and outputs them to the drive units (omitted from drawings) in the inverter IV as the electric power conversion circuit.

Figure 2A:
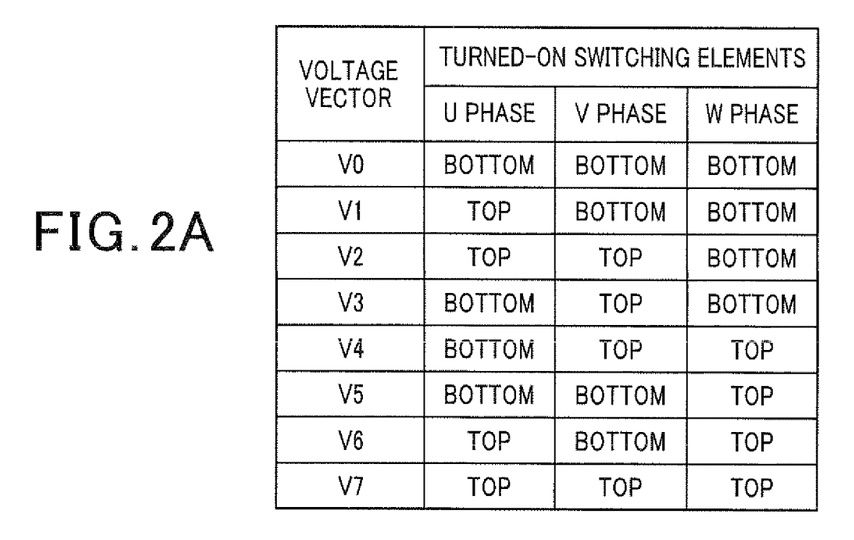
FIG. 2A is a view showing a table regarding a relationship between voltage vectors and switching elements in an inverter which are turned on and off.
Figure 2B:
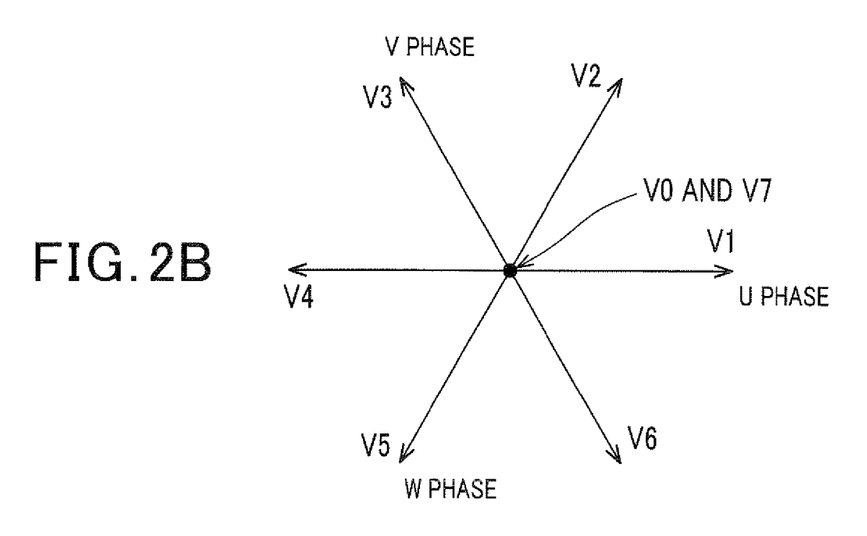
FIG. 2B is a view showing directions of vectors in the U phase, V phase, and W phase.

FIG. 2A is a view showing a table regarding a relationship between voltage vectors and turned-on switching elements in the inverter IV. FIG. 2B is a view showing directions of vectors in the U phase, V phase, and W phase. The voltage vector Vi is composed of six voltage vectors V0 to V7 shown in FIG. 2A and FIG. 2B. That is, the voltage vector Vi composed of the voltage vectors V0 to V7 expresses the operation state of the inverter IV as shown in FIG. 2A and FIG. 2B. For example, the voltage vector V0 expresses the operation state of the inverter IV in which the switching elements Sun, Svn, and Swn in the low voltage side are turned on. These switching elements Sun, Svn, and Swn are designated by reference character "Bottom" in FIG. 2A. The reference character "Bottom" indicates the switching elements arranged at the Bottom side in each of the three series connection units in the inverter IV.

On the other hand, the voltage vector V7 expresses the operation state of the inverter IV in which the switching elements Sup, Svp, and Swp in the high voltage side are turned on. These switching elements Sup, Svp, and Swp are designated by reference character "Upper" in FIG. 2A. The reference character "Upper" indicates the switching elements arranged at the Upper side in each of the three series connection units in the inverter IV.

Because the voltage vectors V0 and V7 make a short circuit of all the three phases of the motor generator 10, and the inverter IV supplies the voltage of zero to the motor generator 10, these voltage vectors V0 and V7 will be also called to the "zero vector".

Other voltage vectors V1 to V6 express the operation states of the inverter IV in which one of the switching elements in each of the three series connection units is turned on. These voltage vectors V1 and V6 will be also called to the "non-zero vector".

As shown in FIG. 2B, the voltage vectors V1, V3, and V5 correspond to the U phase, V phase, and W phase, respectively.

Next, a description will now be given of the operation of the prediction model control unit 30 in the control device 20 according to the first embodiment of the present invention.

As shown in FIG. 1, the operation state setting unit 31 in the control device 20 sets various operation states of the inverter IV. In the first embodiment, the operation state setting unit 31 uses the voltage vectors V0 to V7 which represent the operation states of the inverter IV.

The dq conversion unit 32 performs the d-q conversion of the voltage vectors which are set by and transferred from the operation state setting unit 31 in order to calculate the voltage vector Vdq=(vd, vq) in a d-q coordinate system. On performing the above d-q conversion of the voltage vector, it is sufficient for the operation state setting unit 31 to express the voltage vectors V0 to V7 with "VDC/2" as the upper side switching element, and with "−VDC/2" as the bottom side switching element in each of the three series connection units in the inverter IV shown in FIG. 2A. In this case, the voltage vector V0 can be expressed by (−VDC/2, −VDC/2, −VDC/2), and the voltage vector V1 can be expressed by (VDC/2, −VDC/2, −VDC/2).

A prediction unit 33 predicts the current id, iq when the operation state of the inverter IV becomes the operation state which is set by the operation state setting unit 31 on the basis of the voltage vector (vd, vq), the true current values id, iq, and electric angular velocity ω.

The prediction unit 33 predicts the current in one step forward by discretization of the following equations (c3) and (c4), where these equations (c3) and (c4) are obtained by solving the voltage equation expressed by the equations (c1) and (c2) using differential terms of current components.

$$vd = (R+pLd)Id - \omega Lqiq \quad (c1),$$

$$vq = \omega Ldid(R+pLd)iq + \omega\psi \quad (c2),$$

$$pid = -(R/Ld)id + \omega(Lq/Ld)iq + vd/Ld \quad (c3), \text{ and}$$

$$piq = -\omega(Ld/Lq)id - (Rd/Lq)iq + vq/Lq - \omega\psi/Lq \quad (c4),$$

where R designates a resistance value, p indicates a difference operator, Ld denotes d-axis inductance, Lq represents q-axis inductance, and ψ designates armature flux linkage constant.

The above step for predicting the current in one step forward is performed every available operation states obtained by the operation state setting unit 31.

On the other hand, an operation state determination unit 34 receives the predicted current values ide, idq predicted by the prediction unit 33 and the instruction current values idr, iqr generated by the instruction current setting unit 24. The operation state determination unit 34 then determines the operation state of the inverter IV on the basis of these received values.

The operation state determination unit 34 evaluates each of the operation states of the inverter IV set by the operation state setting unit 31 by using an evaluation function J, and selects the operation state having the highest evaluation value.

The control device 20 according to the first embodiment uses the evaluation function J which outputs a more large value when the evaluation result takes a lower value. Specifically, the evaluation junction J is calculated on the basis of an inner product value between the instruction current vector Idqr=(ir, iqr) and the predicted current vector Idqe=(ide, idq). Because the difference in a corresponding component between the instruction current vector Idqr and the predicted current vector Idqe takes a positive or negative value, the evaluation function J which outputs a more large value when the evaluation result takes a lower value. Thus, the more the difference in each component between the instruction current vector Idqr and the predicted current vector Idqe becomes large, the more the evaluation result is decreased.

Figure 3:
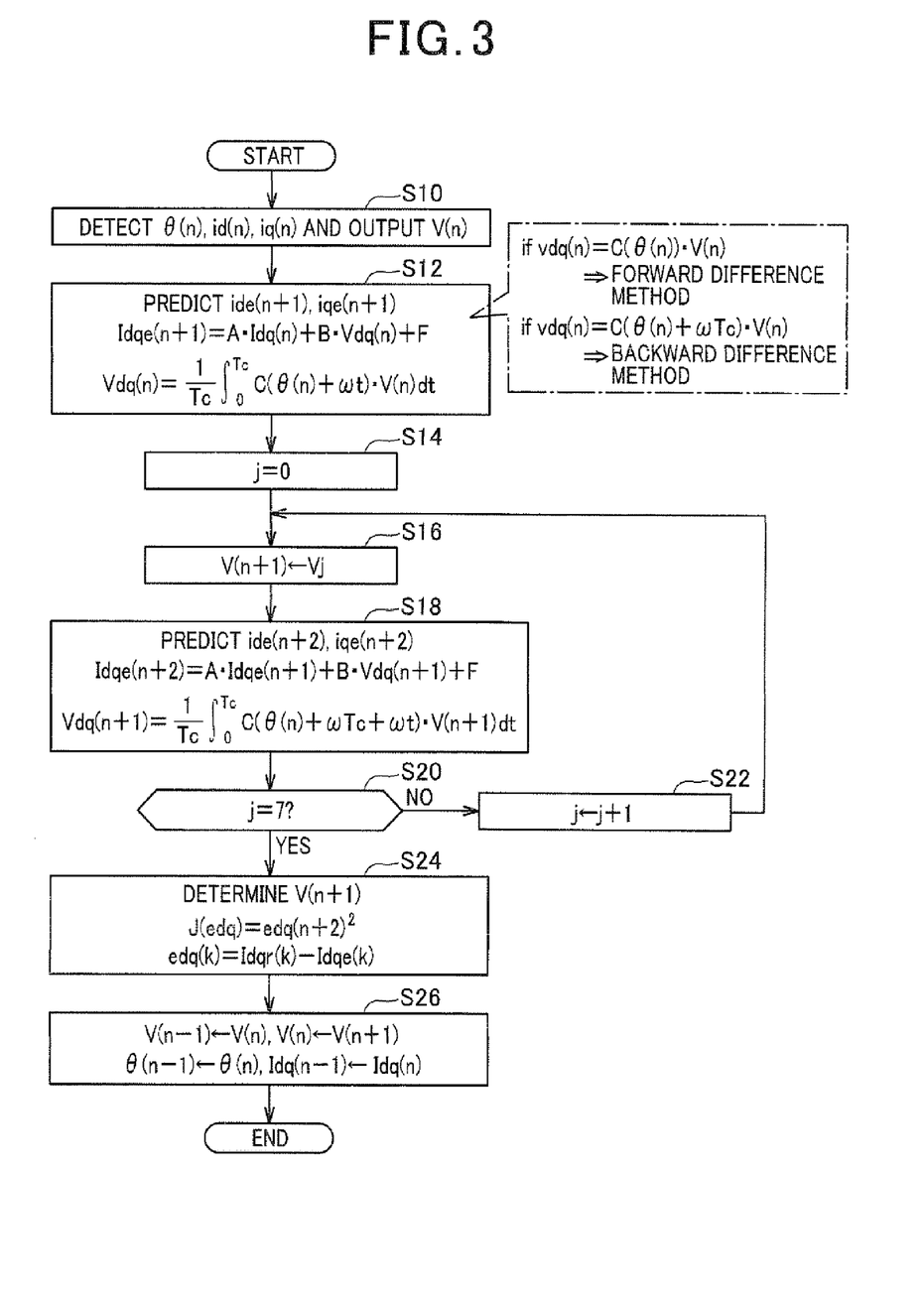
FIG. 3 is a view showing a flow chart of a prediction model control performed by the control device according to the first embodiment of the present invention.

FIG. 3 is a view showing a flow chart of the prediction model control process performed by the control device 20 according to the first embodiment of the present invention. The control device 20 repeatedly performs the prediction model control process at predetermined intervals of the control period Tc.

Firstly, step S10 in the series of steps of performing the prediction model control detects an electric angle θ(n) and true currents id(n), id(q), and outputs a voltage vector V(n) which is determined in a previous control period.

Step S12 predicts the currents (ide(n+1), iqe(n+1)) in one control step forward. The process of step S12 predicts the current in one step forward on the basis of the voltage vector V(n) determined in step S10. That is, step S12 calculates the current values ide(n+1), iqe(n+1) by the model obtained by discretization of the model which is expressed with the equations (c3) and (c4) with the control period Tc by Forward difference method or Backward difference method. In the first embodiment, it is preferable to use the Forward difference method in order to simplify the model. The Forward difference method uses, as initial current values, the true current values id(n), iq(n) detected in step S10.

The voltage vector on d-q axis in the d-q coordination system is obtained by dividing the voltage vector V(n) with the integrated value in time (or time integrated value) during one control period Tc, where the time integrated value is obtained by using, as the initial value, the voltage value at the electric angle θ(n) detected in step S10. This step of calculating the voltage Vdq can be expressed by the following equation (c5), $$Vdq = \frac{1}{Tc}\int_0^{Tc}\begin{pmatrix}\cos(\theta(n)+\omega t) & \sin(\theta(n)+\omega t) \\ \sin(\theta(n)+\omega t) & \cos(\theta(n)+\omega t)\end{pmatrix}\begin{pmatrix}V\alpha \\ V\beta\end{pmatrix}dt = \frac{1}{\omega Tc}\begin{pmatrix}V\alpha\{\sin(\theta(n)+\omega Tc)-\sin\theta(n)\} - \\ V\beta\{\cos(\theta(n)+\omega Tc)-\cos\theta(n)\} \\ V\alpha\{\cos(\theta(n)+\omega Tc)-\cos\theta(n)\} + \\ V\beta\{\sin(\theta(n)+\omega Tc)-\sin\theta(n)\}\end{pmatrix} \quad (c5)$$

The voltage vector (Vα, Vβ) on α-β axis in the equation (c5) are obtained by converting the voltage vector V(n) in three dimension expression to the voltage vectors in two dimension expression. Specifically, the U phase and α axis are set in the same phase, and β axis is determined so that the β axis is perpendicular to the α axis and the U phase.

In steps S14 to S22, the control device 20 performs the process of predicting the current in two steps forward of the control period in each of the states of the voltage vectors in the next control period.

That is, in step S14, the value of zero is set to the variable j with which the voltage vector is determined.

In step S16, the voltage vector Vj is set as the voltage vector V(n+1) which is used in the next control period.

In step S18, as in the case for step S12, the predicted current ide(n+2) and iqe(n+2) are calculated by using the predicted current values ide(n+1), idq(n+1) as the current initial values.

The voltage vector on d-q axis in the d-q coordination system is obtained by dividing the integrated value in time (or time integrated value) during one control period Tc, where the time integrated value is obtained by using, as an initial value, the angle initial value θ(n)+ωTc which is obtained by adding ωTc to the electric angle θ detected in step S10.

In step S20, the control device 20 detects whether or not the variable j is seven (j=7). That is, this process detects whether or not the current prediction of all the voltage vectors V0 to V7 is completed. When the detection result in step S20 indicates the negation ("NO" in step S20), the variable j is incremented by one. The operation flow returns to step S16. On the other hand, when the detection result in step S20 indicates the affirmation ("YES" in step S20), the operation flow goes to step S24.

In step S24, the control device 20 determines the voltage vector V(n+1) in the next control period. This voltage vector V(n+1) is set as a final voltage vector V(n+1) which can minimize the value of the evaluation function J. That is, the predicted current values ide(n+2) and iqe(n+2) of each of the voltage vectors V0 to V7 are calculated when the detection result in step S20 indicates the affirmation ("YES" in step S20). This makes it possible to calculate the eight values of the evaluation function J by using the eighth predicted current values ide(n+2) and iqe(n+2).

In step S26, the voltage vectors V(n), V(n+1) are used as the voltage vectors V(n−1), V(n), and the electric angle θ(n) is used as the electric angle θ(n−1), and the true current values id(n), iq(n) are used as the true current values id(n−1), iq(n−1).

When the process in step S26 is completed, the series of steps of the prediction model control process shown in FIG. 3 is temporarily completed.

Figure 4:
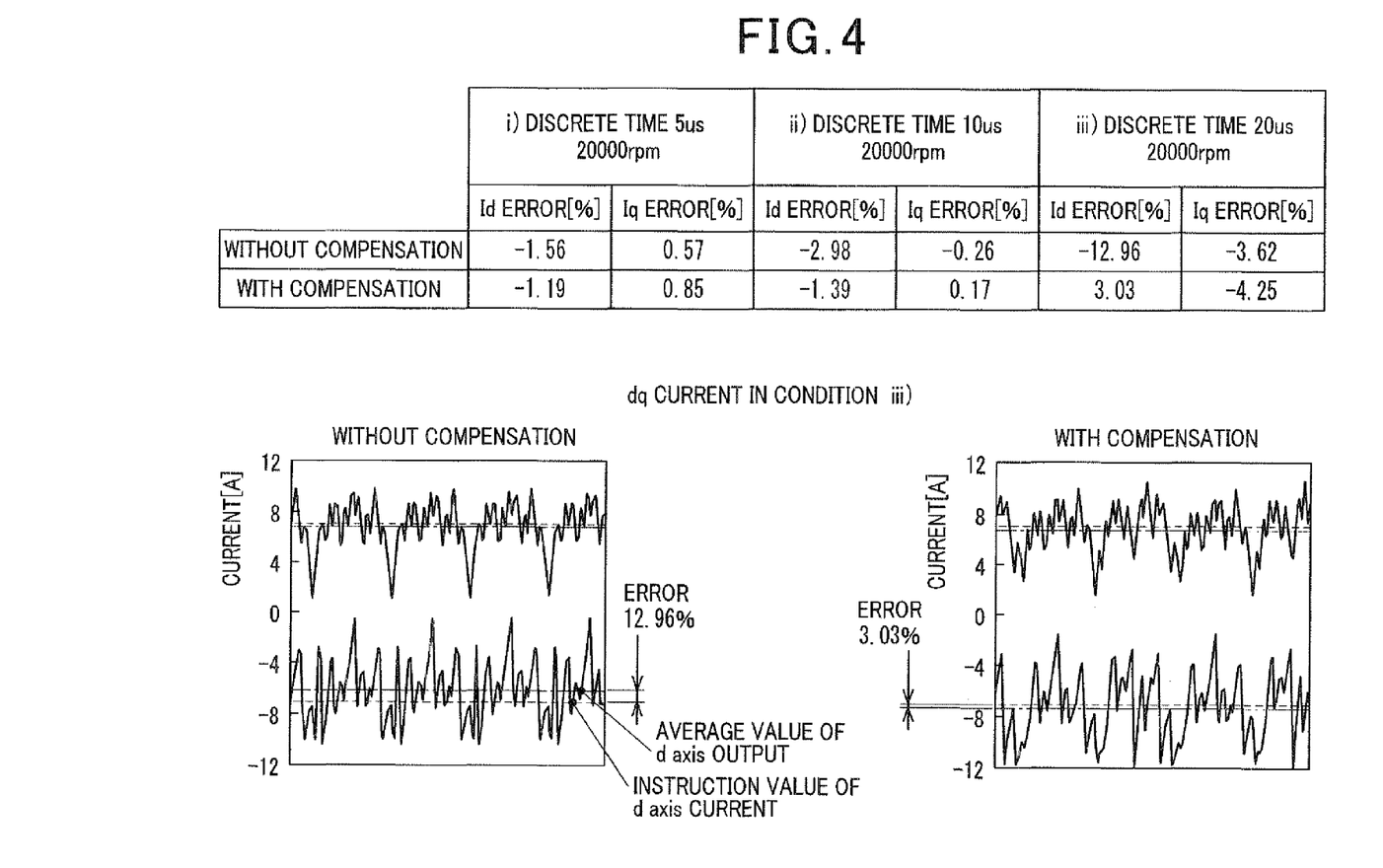
FIG. 4 is a view showing effects obtained by the prediction model control performed by the drive device according to the first embodiment of the present invention.

FIG. 4 is a view showing the effects obtained by the prediction model control performed by the drive device 20 according to the first embodiment. In particular, FIG. 4 shows the effects obtained when the voltage vector values Vdq(n), Vdq(n+1) on d-q axis are set in step S12 and step S18. FIG. 4 shows the calculation results of the two cases, one case does not perform any compensation in step S12 and step S18, and the other case performs the compensation in step S12 and step S18. That is, as shown in FIG. 4, one case uses the voltage vector at the electric angle θ(n) and the voltage vector at the electric angle θ(n)+ωTc obtained by the application of the forward difference method without any compensation, and the other case uses them obtained by discretization with compensation performed by the forward difference method. As can be understood from FIG. 4, the control device 30 according to the first embodiment with compensation can decrease an error of the current which is used as the control value of the motor generator 10.

As described above, the control device 20 according to the first embodiment has the following effects (1) to (4).

(1) Each component of the output voltage vector V(n+1) of the inverter IV in the rotation coordinate system on the virtual (or simulation) operation state of the inverter IV is set with a value at a time during the period counted from the time (a) when the virtual operation state is set to the inverter IV (at the time when the electric angle becomes the value of θ(n)+ωTc) to the time (b) when the operation state of the inverter IV becomes the operation state corresponding to the predicted control value (at the time when the electric angle becomes the value of θ(n)+2ωTc). This makes it possible to suppress an error generated by the discretization of the voltage vector from being decreased.

(2) The control device 20 according to the first embodiment uses the discrete model which is obtained by discrete, by the forward difference method, of the relation model in a rotary coordinate system between the current flowing in the motor generator 10 and the output voltage vector of the inverter IV.

Each component of the output voltage vector of the inverter IV when the virtual operation state is set to the inverter IV is adjusted so that each component of the output voltage vector is set with the value at a time (for example, a predetermined time) during the above period (see (1)). This makes it possible to simply and easily adjust an error caused by performing the discretization because the discretization of the model is performed by the forward difference method or the backward difference method.

(3) The control device 20 according to the first embodiment uses the average value during the above period (see (1)) as the output voltage vector of the inverter IV when the virtual operation state is set to the inverter IV. This makes it possible to suppress the error caused by discretization from being increased.

(4) On calculating the initial value when the control value of the motor generator 10 is predicted under the operation state of the inverter IV in the next updating time, the control device 20 sets the value at a time (for example, a predetermined time) during the period to each component of the output voltage vector of the inverter IV in a rotary coordination system which corresponds to the already determined operation state of the inverter IV, where the above period is counted from the time (a') when the determined operation state is set to the inverter IV (at the time when the electric angle becomes θ(n) to the time (b') when the operation state of the inverter becomes the predicted operation state obtained on the basis of the initial value (at the time when the electric angle becomes θ(n)+ωTc). This makes it possible to set the initial value with high accuracy, which is used for predicting the control value by the prediction model control.

Second Embodiment

A description will be given of the control device 20 according to a second embodiment of the present invention with reference to FIG. 5.

The following description will mainly explain the difference between the second embodiment and the first embodiment.

Figure 5:
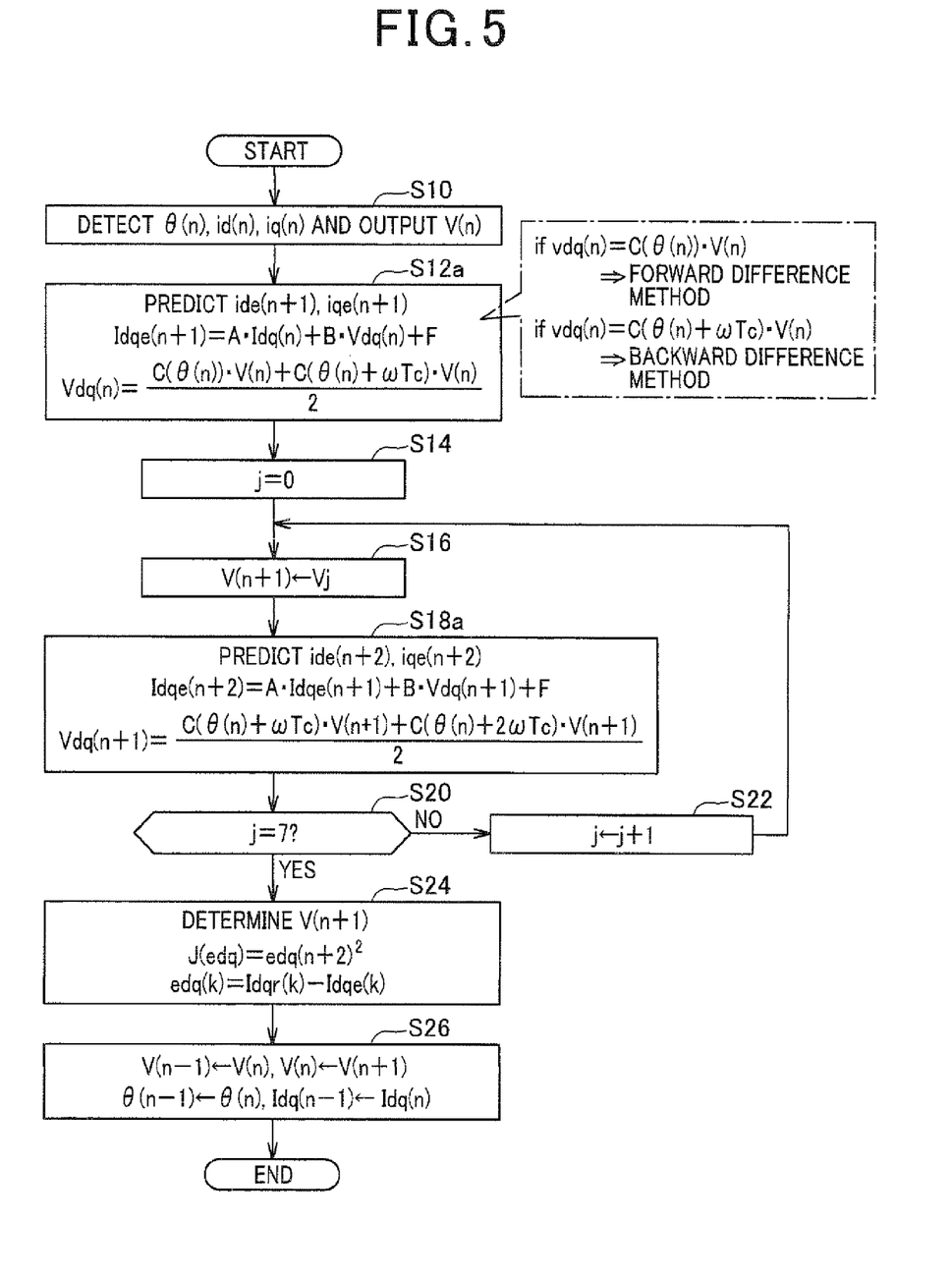
FIG. 5 is a view showing a flow chart of performing a prediction model control by a control device according to a second embodiment of the present invention.

The control device 20 according to the second embodiment determines the voltage vectors V(n) and V(n+1) by the steps shown in FIG. 5. FIG. 5 is a view showing a flow chart of performing the prediction model control by the control device 20 according to the second embodiment of the present invention. That is, FIG. 5 shows the procedure to perform the prediction model control according to the second embodiment.

The control device 20 repeatedly performs the prediction model control shown in the series of stapes shown in FIG. 5 at predetermined intervals of the control period Tc.

In step S12a, the control device 20 according to the second embodiment sets, to the voltage vector V(n), the average value between the value at the time when the determined operation state is set to the inverter IV (at the time when the electric angle becomes θ(n)) and the value at the time when the operation state of the inverter IV becomes the predicted operation state on the basis of the initial value (at the time when the electric angle becomes the value (at the time when the electric angle becomes θ(n)+ωTc).

The average voltage vector V(n) can be expressed by the following equation (c6), $$Vdq = \frac{1}{2}\left\{\begin{pmatrix} \cos(\theta(n)+\omega Tc) & \sin(\theta(n)+\omega Tc) \\ \sin(\theta(n)+\omega Tc) & \cos(\theta(n)+\omega Tc) \end{pmatrix} + \begin{pmatrix} \cos\theta(n) & \sin\theta(n) \\ \sin\theta(n) & \cos\theta(n) \end{pmatrix}\right\}\begin{pmatrix} V\alpha \\ V\beta \end{pmatrix}. \quad (c6)$$

In step S18a, the control device 20 sets, as the voltage vector V(n+1), the average value between the value at the time when the virtual operation state is set to the inverter IV (at the time when the electric angle becomes the value θ(n)+ωTc) and the value at the time when the current becomes the predicted current (at the time when the electric angle becomes the value θ(n)+2ωTc).

It is possible for the prediction model control performed by the control device 20 according to the second embodiment to have the same effect (having the same value of the first embodiment shown in FIG. 4) to suppress the error from being increased.

Third Embodiment

A description will be given of the control device 20 according to the third embodiment of the present invention with reference to FIG. 6.

The following description will mainly explain the difference between the third embodiment and the first embodiment.

Figure 6:
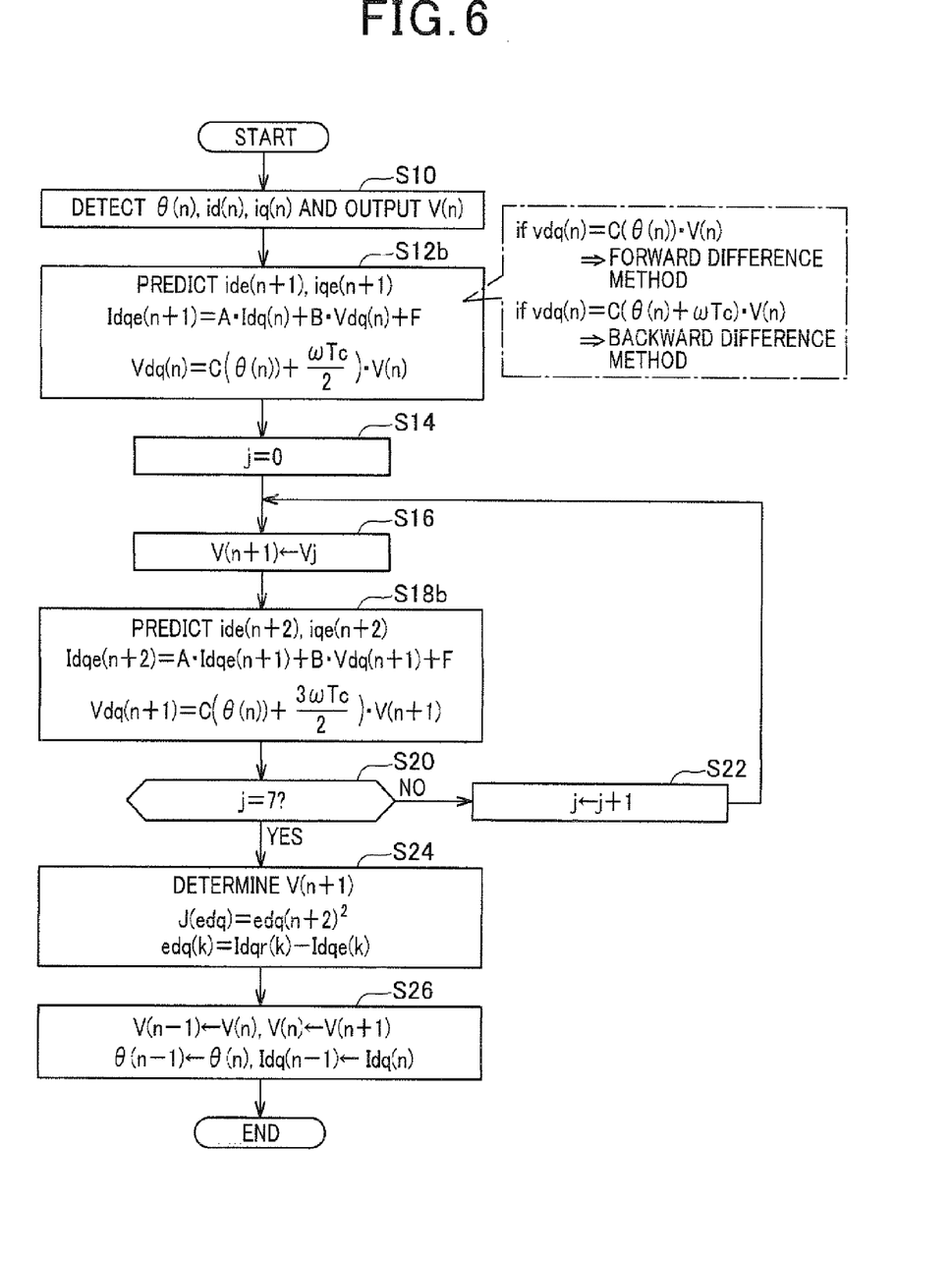
FIG. 6 is a view showing a flow chart of performing a prediction model control by a control device according to a third embodiment of the present invention.

The control device 20 according to the third embodiment determines the voltage vectors V(n) and V(n+1) by the series of steps shown in FIG. 6. FIG. 6 is a view showing a flow chart of performing the prediction model control by the control device 20 according to the third embodiment. That is, FIG. 6 shows the procedure to perform the prediction model control according to the third embodiment.

The control device 20 repeatedly performs the prediction model control by the series of steps shown in FIG. 6 at predetermined intervals of the control period Tc.

In step S12b, the control device 20 sets, to the voltage vector V(n), the value at the median time (at the time when the electric angle becomes the value $\theta(n)+\omega Tc/2$) between the time when the determined operation state is set to the inverter IV (at the time when the electric angle becomes $\theta(n)$) and the value at the time when the operation state of the inverter IV becomes the predicted operation state obtained on the basis of the initial value (at which the electric angle becomes the value $\theta(n)+\omega Tc$). The voltage vector V(n) at the median time can be expressed by the following equation (c7), $$Vdq = \begin{pmatrix} \cos(\theta(n)+\omega Tc/2) & \sin(\theta(n)+\omega Tc/2) \\ \sin(\theta(n)+\omega Tc/2) & \cos(\theta(n)+\omega Tc/2) \end{pmatrix} \begin{pmatrix} V\alpha \\ V\beta \end{pmatrix}. \quad (c7)$$

In step S18b, the control device 20 sets, to the voltage vector V(n+1), the value at the median time (at the time when the electric angle becomes the value $\theta(n)+3\omega Tc/2$) between the value at the time when the virtual (or simulation) operation state is set to the inverter IV (at the time when the electric angle becomes $\theta(n)+\omega Tc$) and the value at the time at the time when the current becomes the predicted current (at the time when the electric angle becomes $\theta(n)+2\omega Tc$).

It is possible for the control device 20 according to the third embodiment to perform the prediction model control with the same effect of the first embodiment shown in FIG. 4 capable of suppressing the error from being increased.

Fourth Embodiment

A description will be given of a control device according to a fourth embodiment of the present invention with reference to FIG. 7.

The following description will mainly explain the difference between the fourth embodiment and the first embodiment.

The control device 20 according to the fourth embodiment uses the output torque and the magnetic flux of the motor generator 10 as direct control values, and determines the operation state of the inverter IV on the basis of the instruction values and the predicted values of the output torque and the magnetic flux of the motor generator 10.

Figure 7:
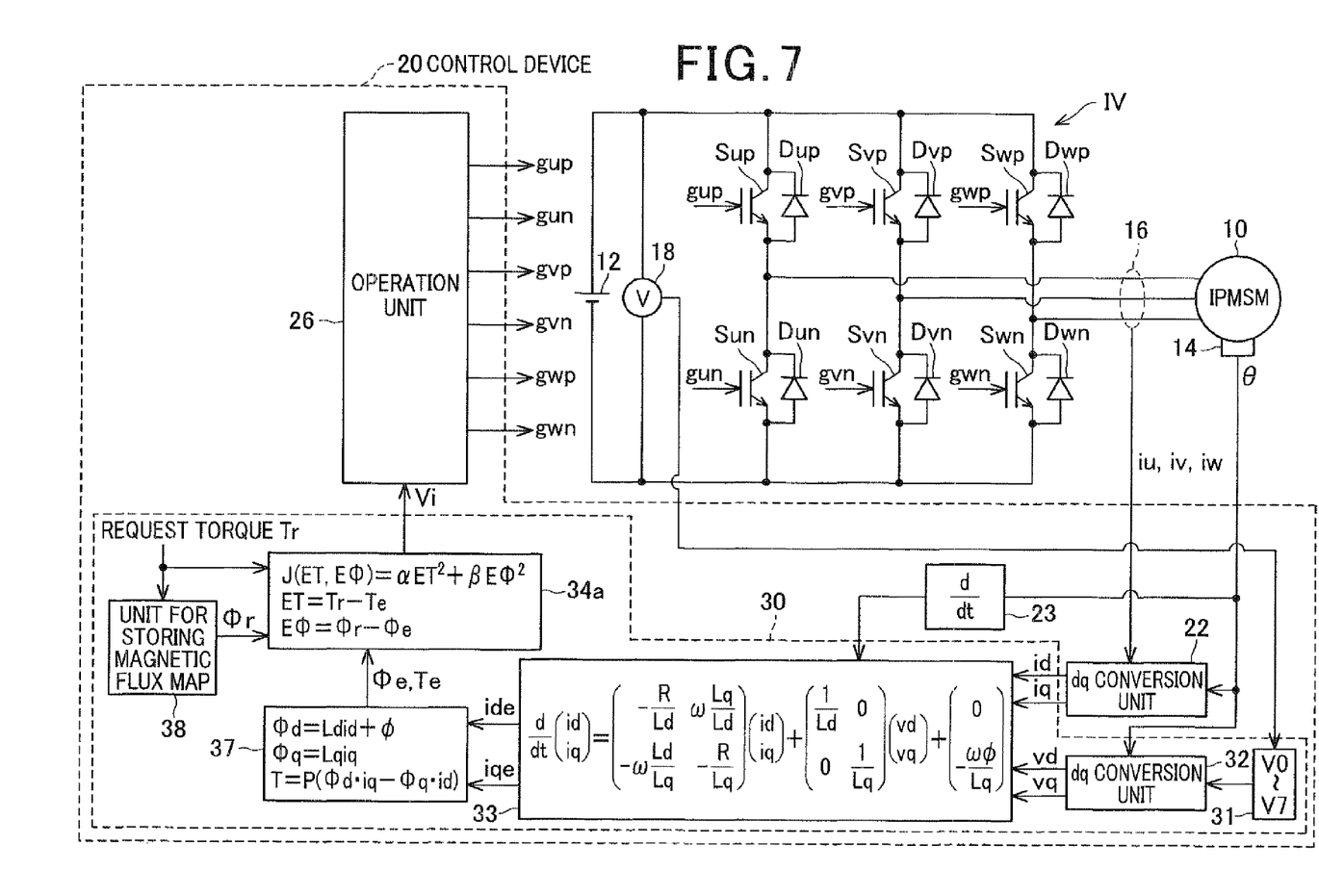
FIG. 7 is a view showing a configuration of a motor generator control system having a control device according to a fourth embodiment of the present invention.

FIG. 7 is a view showing a configuration of the motor generator control system having the control device 20 according to the fourth embodiment of the present invention. FIG. 7 according to the fourth embodiment shows the same components of the motor generator control system according to the first embodiment shown in FIG. 1 with the same reference numbers and characters.

As shown in FIG. 7, the torque and magnetic flux prediction unit 37 predicts the magnetic flux vector Φ and the torque T of the motor generator 10 on the basis of the predicted current ide, idq.

The magnetic flux vector Φ=(Φd, Φq) can be predicted by using the following equations (c8) and (c9), and the torque T can be predicted by using the equation (c10).

$$\Phi d = Ld \cdot id + \phi \quad (c8),$$

$$\Phi q = Lq \cdot iq \quad (c9), \text{ and}$$

$$T = P(\Phi d \cdot iq - \Phi q \cdot id) \quad (c10),$$

where P designates pairs of poles.

On the other hand, the magnetic flux map unit 38 sets the instruction magnetic flux vector Φr on the basis of the request torque Tr.

The instruction magnetic flux vector Φr used in the fourth embodiment is determined by the optimum request which is selected from various request torques Tr, where the optimum torque Tr is the maximum torque obtained by the minimum current, for example.

The operation state determination unit 34a determines the final operation state of the inverter IV on the basis of the evaluation function J. This evaluation function J is obtained on the basis of the difference in each component between the predicted torque Te and the request torque Tr and the difference between the predicted magnetic flux vector Φe and the instruction magnetic flux Φ4. In more detail, the evaluation function J is determined on the basis of the sum of values obtained by multiplying the square of the above difference with weight coefficients $\alpha, \beta$ ($\alpha \neq \beta$, $\alpha \neq 0$, $\beta \neq 0$), where the weight coefficients are introduced because the torque is different in magnitude from the magnetic flux. That is, the difference between the predicted torque and the request torque becomes large when the torque is increased. When the operation state of the inverter IV is predicted without using any weight coefficient, there is a possibility of causing a drawback of not decreasing the evaluation result even if the low voltage with a low control of the magnetic flux is used. In order to avoid such a drawback, it is preferable to use the weight coefficients $\alpha, \beta$ in order to adjust the difference in absolute value of various input parameters to be provided to the evaluation function J.

The predicted torque Te and the predicted magnetic flux Φe are calculated by using the predicted current obtained by the method of the first embodiment as the initial value. That is, because the system shown in FIG. 7 is not equipped with any unit to directly detect the output torque and the magnetic flux of the motor generator 10, the control device 20 according to the fourth embodiment predicts the torque and the magnetic flux as the control values of the motor generator 10 on the basis of the current detected by the current sensor 16. The control device 20 according to the fourth embodiment uses, as the initial value, the predicted current value at the next updating time n+1 when performing the prediction model control of the torque and magnetic flux according to the operation state of the inverter IV at the next updating time n+1.

(Other Modifications)

The concept of the present invention is not limited by the first to fourth embodiments previously described. It is possible for the control device 20 to have, for example, the following modifications.

<Method of Adjusting Error Caused by Discretization>

The present invention is not limited by the method of the prediction model control disclosed in the first to fourth embodiments in which when the virtual operation state is set to the inverter IV during the discretization, the control device sets, as each component of the output voltage in the rotary coordinate system, the control value at a time (for example, a predetermined time) during the period counted from the time when the operation state of the inverter IV is updated to the time when the inverter IV becomes the operation state corresponding to the predicted control values. Instead of the above method, it is possible to use, for example, the values at one third time (⅓ time) in the above period as each component of the output voltage in the rotary coordinate system.

It is also possible for the control device 20 to perform bilinear transform method instead of using the forward difference method or the backward difference method. When the control device 20 according to the first embodiment performs such bilinear transform method, the two discretized linear equations solved by the predicted current ide(n+1) and idq(n+1) become complicated because it generates square of the electric angle velocity ω, as in the case for the backward difference method.

Further, it is also effective for the prediction model control unit to use the adjusting method disclosed in the first to fourth embodiments when predicting the control values of the motor generator 10. That is, because the motor parameters such as inductance and magnetic flux, and coefficient in a plurality of dimensions depend on the electric angle, it is possible to suppress error generated in discretization from being increased by using the adjusting methods previously described. However, this case requires a complicated structure of the prediction model control unit.

<Prediction Model Control Method>

The control device 20 according to the first to fourth embodiments predicts the control values of the motor generator 10 corresponding to the operation state of the inverter IV at the next updating timing (at one control period forward), the present invention is not limited by this. For example, it is possible to determine the operation state of the inverter IV at the updating time in one control period forward by sequentially predicting the operation state of the inverter IV at the updating time in several times forward.

In this case, it is preferable for each component of the output voltage vector corresponding to the operation state of the inverter IV at each updating time to have the value at a time (for example, a predetermined time) during the period counted from the updating time to the time at which the operation state of the inverter becomes the predicted operation state corresponding to this updating time.

In each of the first to fourth embodiments previously described, the current detection time is synchronized with the time of updating the operation state of the inverter IV. However, the present invention is not limited by this. For example, it is possible to detect the current flowing in the target motor generator to be controlled at the median time during a pair of adjacent updating times in series. In this case, it is also effective to predict the current at the next updating time on the basis of the detected current as the prediction initial value corresponding to the operation state of the inverter IV at the next updating time.

In each of the first to fourth embodiments previously described, the control device 20 predicts the control value at one control forward counted from the updating time of the operation state of the inverter IV. However, the present invention is not limited by this. For example, it is possible to predict the control value at a time during the period counted from the updating time of the operation state of the inverter IV to the time when the one control period is elapsed from this updating time It is also possible to use different setting methods of setting the output voltage vector to be used on predicting the predicted currents ide(n+1) and iqe(n+1), and the output voltage vector used when the initial value is predicted. For example, it is possible for the method used in the first embodiment to set the output voltage vector to be used on predicting the predicted currents ide(n+1), iqe(n+1), and for the method disclosed in the second embodiment to set the output voltage vector to be used on predicting the initial value.

It is also possible to use the current prediction model without considering of iron loss, or with considering of iron loss.

The control device 20 according to the first to fourth embodiments uses the current prediction model on the basis of a standard waveform. However, the present invention is not limited by this. For example, it is possible to use the current prediction model considering high frequency components of inductance and induced voltage.

The control device 20 according to the first to fourth embodiments uses the current prediction unit which predicts the currents on the basis of the prediction model control. However, the present invention is not limited by this. For example, it is possible to predict the currents on the basis of a map which inputs various parameters such as voltage (vd, vq) and electric angle velocity ω and further inputs a temperature as a parameter. This map is stored in a memory means. This map stores the relationship between input parameters and output parameters in a discrete state.

The control device 20 according to the first to fourth embodiments predicts virtual operation states (which correspond to the voltage vectors V0 to V7) of the inverter IV as the power conversion circuit, and then predicts the control values of the motor generator 10 on the basis of the voltage vectors V0 to V7 as the available virtual operation states. However, the present invention is not limited by this. For example, it is possible to eliminate the operation state corresponding to the phase whose switching state is often switched from the target operation states in prediction.

<Regarding Control Values>

The control device 20 according to the first to fourth embodiments uses the output torque, the magnetic flux, and the current of the motor generator 10 as the control values to be used for determining the various operation states of the inverter IV (as an electric power conversion circuit) on the basis of the instructions and the predicted values. However, the present invention is not limited by this. For example, it is possible to use one of the output torque and the magnetic flux of the motor generator 10. Further, it is also possible to use the output torque and the current of the motor generator 10. Still further, when the control value other than the current of the motor generator 10 is used, it is possible for a sensor to directly detect the control value other than the current of the motor generator 10.

The control device 20 according to the first to fourth embodiments uses the output torque of the motor generator 10 as the final control value (which is finally controlled regardless of the prediction target). However, the present invention is not limited by this. For example, it is possible to select the rotation speed, etc. as the final control value.

<Other Modifications>

It is possible to apply the control device according to the present invention to optional synchronous electric rotary machines such as surface permanent magnet synchronous motors (SPMSM) and field winding synchronous motors instead of interior Permanent Magnet Synchronous Motor (IPMSM). Further, it is possible to apply the control device according to the present invention to induced electric rotary machines such as induction motors other the synchronous motors.

It is also possible to apply the control device 20 according to the present invention to electric rotary machines to be mounted to electric vehicles instead of hybrid vehicles. Further, it is possible to apply the control device 20 according to the present invention to on-vehicle electric rotary machines other than on-vehicle main machines.

It is also possible for the control device 20 according to the present invention to be connected to output terminals of a converter capable of boosting the voltage of the high voltage battery 12 as a direct power source instead of directly connecting with the high voltage battery 12.

It is also possible to apply the control device 20 according to the present invention to other types of electric power conversion circuits other than the inverter IV equipped with a plurality of switching elements which selectively open and close the connection lines between the voltage battery capable of supplying a plurality of voltages and terminals of the electric rotary machine. For example, there is an electric power conversion circuit, as one of other types of the electric power conversion circuits to be controlled by the control device 20 according to the present invention. This electric power conversion circuit is equipped with switching elements which selectively open and close the connection lines between a voltage supply means and each terminal of the electric rotary machine, where the voltage supply means supplies three different voltages to terminals of the electric rotary machine. Such a type of the electric power conversion circuit to be controlled by the control device is disclosed in conventional documents, for example in Japanese patent laid open publication No. JP 2006-174697.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A control device which controls an electric power conversion circuit in order to adjust control values of an electric rotary machine, the electric power conversion circuit being equipped with a plurality of switching elements with which connection lines between a voltage supply means and terminals of the electric rotary machine are selectively connected and disconnected, the voltage supply means supplying a different voltage to the electric rotary machine, the control device comprising:
a prediction means for predicting the control values of the electric rotary machine corresponding to a virtual operation state of the electric power conversion circuit on the basis of relation information in a rotary coordinate system between an output voltage vector of the electric power conversion circuit and one of the control values and parameters to be used for calculating the control values; and
an operation means for determining a next operation state of the electric power conversion circuit on the basis of the predicted control values obtained by the prediction means, and operating the electric power conversion circuit on the basis of the next operation state,
wherein the prediction means sets, to each component of the output voltage vector of the electric power conversion circuit in the rotary coordinate system, a value at a time during a period counted from the time when the virtual operation state of the electric power conversion circuit is determined and set to the electric power conversion circuit to the time when the control values of the rotary machine become the predicted control values;
wherein the prediction means performs discretization of a relation model in the rotary coordinate system between the output voltage vector of the electric power conversion circuit and one of the control values of the electric rotary machine and the parameters to be used for calculating the control values by one of forward difference method and backward difference method, and the prediction means adjusts each component of the output voltage vector of the power conversion circuit in the virtual operation state with the value at the time during the period.

2. The control device according to claim 1, wherein the prediction means sets a vector at the median time during the period to the output voltage vector of the electric power conversion circuit in the virtual operation state.

3. The control device according to claim 1, wherein the prediction means sets an average value during the period to the output voltage vector of the electric power conversion circuit in the virtual operation state.

4. The control device according to claim 1, wherein the prediction means sets, to each component of the output voltage vector of the electric power conversion circuit in the virtual operation state, the median value between the value at the time when the next operation state is set to the electric power conversion circuit and the value at the time when the operation state of the electric power conversion circuit becomes the predicted operation state.

5. The control device according to claim 1, wherein the prediction means serves as a first prediction means, and the control device further comprises a second prediction means for inputting the operation state of the power conversion circuit which is determined to use the operation state by the operation means, and for predicting an initial value, to be used in the prediction operation by the first prediction means, on the basis of the relation information, and the second prediction means sets, to each component of the output voltage vector of the electric power conversion circuit corresponding to the determined operation state, a value at a time during the period counted from the time when the determined operation state is set to the electric power conversion circuit to the time when the operation state of the electric power conversion circuit becomes the predicted operation state obtained on the basis of the predicted initial value.

6. The control device according to claim 1, wherein the voltage supply means correspond to a direct current power source having a positive electrode and a negative electrode, and the connection lines between the positive electrode and the negative electrode of the direct current power source and the terminals of the electric rotary machine are selectively connected and disconnected by the switching elements of the electric power conversion circuit.

7. The control device according to claim 1, wherein the control values of the electric rotary machine are selected from the output current, the output torque, and the magnetic flux of the electric rotary machine, and the parameters to be used for calculating the control values are selected from a request torque, an instruction current, a true current flowing in each phase of the electric rotary machine, and an electric angle of the electric rotary machine.

8. A control device which controls an electric power conversion circuit in order to adjust control values of an electric rotary machine, the electric power conversion circuit being equipped with a plurality of switching elements with which connection lines between a voltage supply means and terminals of the electric rotary machine are selectively connected and disconnected, the voltage supply means supplying a different voltage to the electric rotary machine, the control device comprising:

a prediction means for predicting the control values of the electric rotary machine corresponding to a virtual operation state of the electric power conversion circuit on the basis of relation information in a rotary coordination system between an output voltage vector of the electric power conversion circuit and one of the control values and parameters to be used for calculating the control values; and an operation means for determining a next operation state of the electric power conversion circuit on the basis of the predicted control values obtained by the prediction means, and operating the electric power conversion circuit on the basis of the next operation state;

wherein the prediction means sets, to each component of the output voltage vector of the electric power conversion circuit in the rotary coordinate system, a value at a time during a period counted from the time when the virtual operation state of the electric power conversion circuit is determined and set to the electric power conversion circuit to the time when the control values of the rotary machine become the predicted control values; and wherein the prediction means sets, to each component of the output voltage vector of the electric power conversion circuit in the virtual operation state, the median value between the value at the time when the next operation state is set to the electric power conversion circuit and the value at the time when the operation state of the electric power conversion circuit becomes the predicted operation state.

9. A control device which controls an electric power conversion circuit in order to adjust control values of an electric rotary machine, the electric power conversion circuit being equipped with a plurality of switching elements with which connection lines between a voltage supply means and terminals of the electric rotary machine are selectively connected and disconnected, the voltage supply means supplying a different voltage to the electric rotary machine, the control device comprising:

a prediction means for predicting the control values of the electric rotary machine corresponding to a virtual operation state of the electric power conversion circuit on the basis of relation information in a rotary coordination system between an output voltage vector of the electric power conversion circuit and one of the control values and parameters to be used for calculating the control values; and an operation means for determining a next operation state of the electric power conversion circuit on the basis of the predicted control values obtained by the prediction means, and operating the electric power conversion circuit on the basis of the next operation state;

wherein the prediction means sets, to each component of the output voltage vector of the electric power conversion circuit in the rotary coordinate system, a value at a time during a period counted from the time when the virtual operation state of the electric power conversion circuit is determined and set to the electric power conversion circuit to the time when the control values of the rotary machine become the predicted control values;

wherein the prediction means sets, to each component of the output voltage vector of the electric power conversion circuit in the virtual operation state, the median value between the value at the time when the next operation state is set to the electric power conversion circuit and the value at the time when the operation state of the electric power conversion circuit becomes the predicted operation state; and wherein the prediction means serves as a first prediction means, and the control device further comprises a second prediction means for inputting the operation state of the power conversion circuit which is determined to use the operation state by the operation means, and for predicting an initial value, to be used in the prediction operation by the first prediction means, on the basis of the relation information, and the second prediction means sets, to each component of the output voltage vector of the electric power conversion circuit corresponding to the determined operation state, a value at a time during the period counted from the time when the determined operation state is set to the electric power conversion circuit to the time when the operation state of the electric power conversion circuit becomes the predicted operation state obtained on the basis of the predicted initial value.

* * * * *